United States Patent [19]

Bryan et al.

[11] Patent Number: 4,888,990
[45] Date of Patent: Dec. 26, 1989

[54] SIGHT GLASS APPARATUS

[75] Inventors: David E. Bryan, Buchanan; Carl M. Dudding, Eagle Rock; John W. Martin, Buchanan, all of Va.

[73] Assignee: Gala Industries, Inc., Eagle Rock, Va.

[21] Appl. No.: 189,348

[22] Filed: May 2, 1988

[51] Int. Cl.⁴ .............................................. G01F 23/02
[52] U.S. Cl. ........................................ 73/326; 73/323; 73/325; 285/45; 285/93; 285/911
[58] Field of Search ................. 73/323, 325, 326, 328; 116/276; 137/559; 285/93, 45, 911

[56] References Cited

U.S. PATENT DOCUMENTS

| | | | |
|---|---|---|---|
| 1,042,730 | 10/1912 | Walquist | 116/276 |
| 1,078,552 | 11/1913 | Patterson | 116/276 |
| 1,615,118 | 1/1927 | Farragher et al. | 73/326 |
| 1,886,444 | 11/1932 | Wurster | 116/276 |
| 2,624,308 | 1/1953 | Wittlin | 116/276 |
| 2,655,124 | 10/1953 | Gary et al. | 116/276 |
| 2,744,488 | 5/1956 | Wittlin | 116/276 |
| 2,780,199 | 2/1957 | Wittlin | 116/276 |
| 2,842,089 | 7/1958 | Midkiff | 116/276 |
| 3,672,749 | 6/1972 | Roser | 350/319 |
| 4,162,826 | 7/1979 | Van der Beck et al. | 350/319 |
| 4,372,652 | 2/1983 | Pontefract | 350/319 |
| 4,697,613 | 10/1987 | Wienck | 137/171 |

FOREIGN PATENT DOCUMENTS 983796 2/1965 United Kingdom ................. 137/559

Primary Examiner—William A. Cuchlinski, Jr.
Assistant Examiner—W. Morris Worth
Attorney, Agent, or Firm—Fleit, Jacobson, Cohn, Price Holman & Stern

[57] ABSTRACT

A sight glass apparatus and method limiting external pressures on the sight glass. The sight glass apparatus has a pair of flanges wherein each of the flanges includes a tubular top portion which abuts the respective pipes. The tubular top portion includes a circular cut-out for providing a victaulic type connection for a clamping means to clamp to the respective pipes and a conical section which tapers into an annular rim section having a plurality of apertures wherein a bottom portion of the annular rim includes a center aperture being co-axially aligned when mounted to the pipes. An O-ring is mounted in a recess with a cylindrical glass tubing for observing the fluid or the like. The sight glass apparatus further includes machine precisioned shoulder studs with threaded ends. The ends protruding through the apertures of each of flange when connecting the sight glass apparatus together. Therefore, the machined precision shoulder stud bears most of the sealing pressure and limits the movement of the flanges towards each other so that the axial pressure exerted on the cylindrical glass tubing is minimal.

1 Claim, 1 Drawing Sheet

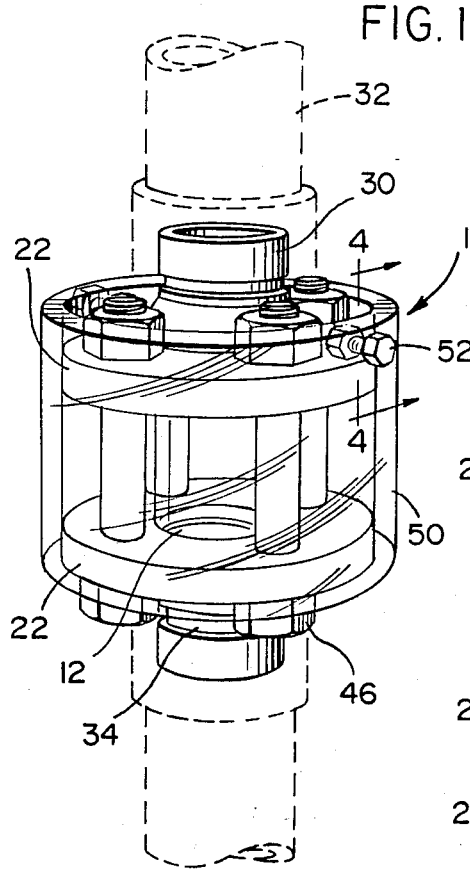
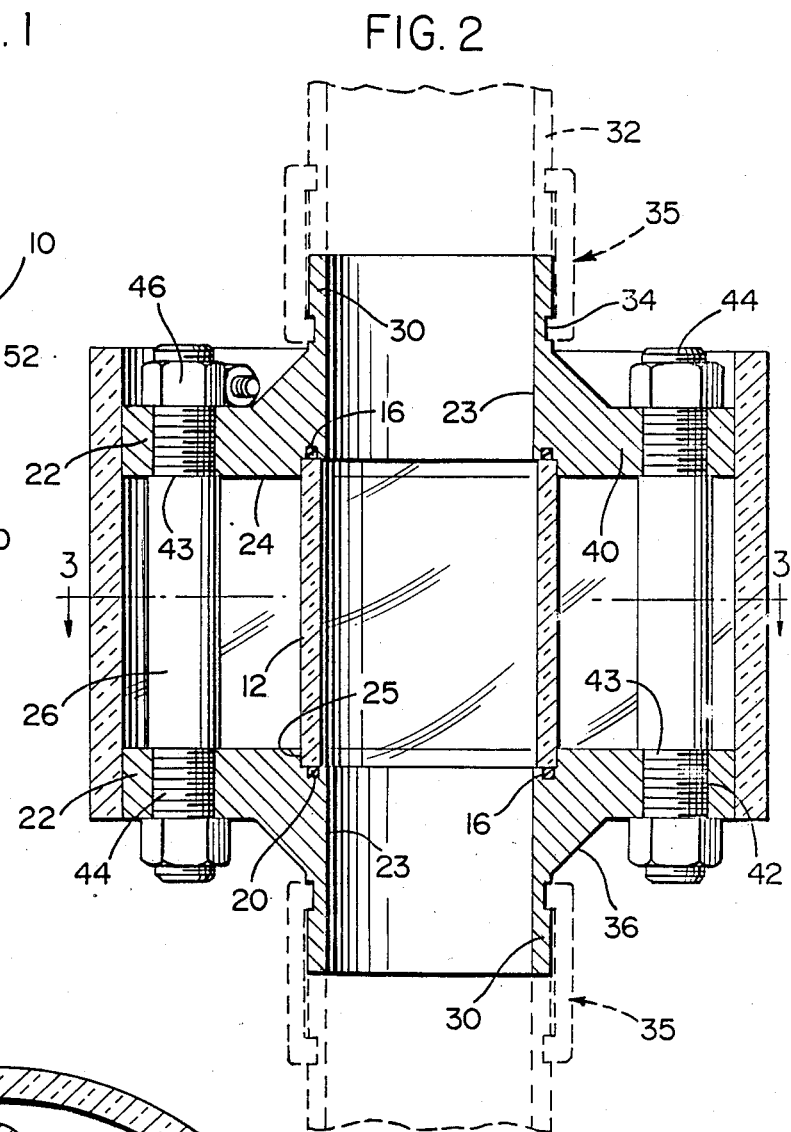
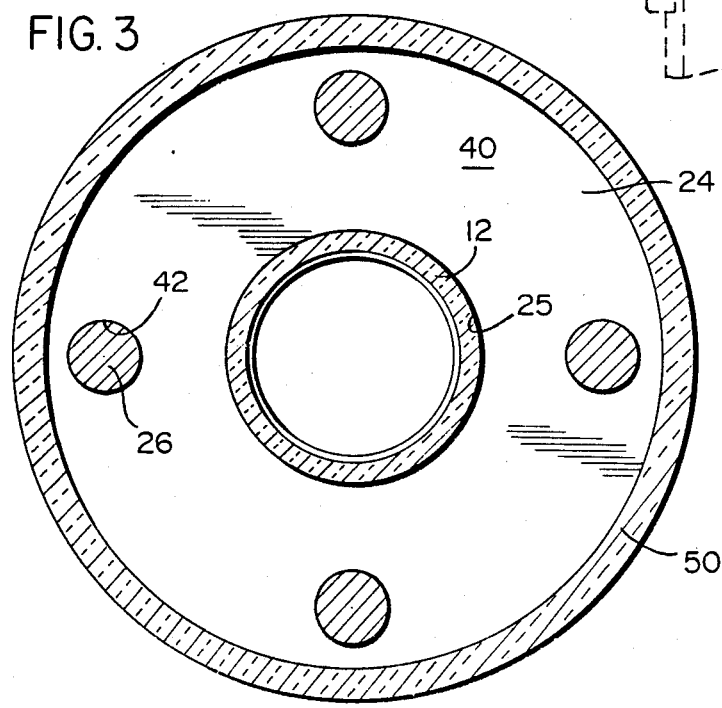
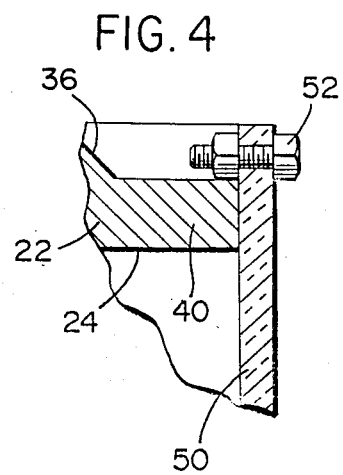

SIGHT GLASS APPARATUS

BACKGROUND OF THE INVENTION

1. Field of the Invention

The present invention generally relates to sight glasses and more particularly to a sight glass where excessive sealing pressures are reduced and maximum visibility is obtained.

2. Description of the Prior Art

Typical industrial sight glasses have no provisions for controlling the absolute compression needed to seal the apparatus. The force applied for sealing is not controlled and during assembly, the glass can be exposed to many different amounts of force. Such force will unnecessarily subject the glass to excessive stress. Thus, weakening the glass before assembly.

Once assembled, the weakened glass is subject to the movement of the attached piping which can create an undesirable force resulting in glass breakage. Also after fitting, the weakened glass is subject to internal fluid pressure which could result in glass breakage.

Another problem with the typical industrial sight glass is that during fitting of the sight glass to the piping, there is no provision to prevent excessive tightening to achieve a water proof seal.

SUMMARY OF THE INVENTION

The present invention provides a sight glass which is isolated from all piping stress. More specifically, the present invention uses machined precision shoulder studs to support the various piping loads. Because the studs are made with shoulders larger than the receiving apertures in the flange mountings, it is nearly impossible for the force, used to tighten the sight glass, to be applied beyond the necessary pressure to achieve a waterproof seal. Also, the studs used are as narrow as possible to maximize the angle of visibility of the sight glass.

The present invention further uses borosilicate glass which is precision ground at the ends to facilitate the use of "O"-rings and only a nominal amount of preload pressure is required for a successful seal.

OBJECTS OF THE INVENTION

It is an object of the invention to have a sight glass apparatus with precision machined shoulder studs which support the various piping loads.

Another object of the invention is to have a sight glass apparatus which will allow the glass element to be isolated from all piping stresses and is subjected to a very little amount of preload stress in order to seal properly.

Yet another object of the invention is to have a sight glass apparatus protected from compression and side-to-side movement.

A further object of the invention is to have a sight glass apparatus that withstands the highest water temperature and pressure.

A still further object of the invention is to have a sight glass apparatus which is easily accessible by maximizing the angle of visibility.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view illustrating the sight glass apparatus of the present invention with the unique features incorporated therein.

FIG. 2 is a longitudinal sectional view, on an enlarged scale, of FIG. 1 illustrating the specific structural details of the unique features of the invention.

FIG. 3 is a transverse sectional view, taken substantially upon a plane passing along section line 3—3 on FIG. 2.

FIG. 4 is a sectional view, on an enlarged scale, taken along section line 4—4 on FIG. 1 illustrating further specific structural details of the unique features of the invention.

DESCRIPTION OF THE PREFERRED EMBODIMENT

Referring now specifically to the drawings, the sight glass apparatus of the present invention is generally designated by the numeral 10.

The sight glass apparatus 10 comprises a sight glass 12 which is tubular or cylindrical. Glass tubing is chosen because it is much stronger in compression from end to end than its compression from side to side. The sight glass 12 is made of borosilicate glass which has excellent thermal shock properties. These properties allow for a wall thickness which will easily handle pressure not in excess of 100 psi.

The ends 14 of the borosilicate sight glass 12 are precision ground to facilitate the use of "O"-rings 16 on each end for sealing.

With the precision ground sight glass 12 in place, the unit 12 is sealed on each end with the "O"-rings 16. Standard "O"-rings and typical "O"-ring grooves 20 are utilized. Since, the "O"-rings 16 help to form a "self-energizing" seal, the glass is not needlessly compressed, thus reducing the possibility of glass breakage.

The "O"-rings 16 are interposed between the flanges 22, and the sight glass 12.

The flanges 22 are identical and have central passageways 23 extending therethrough and are made from stainless steel. Construction of flanges 22 incorporates a "victaulic type" connection, generally indicated by numeral 35, for ease of installation and service of the complete sight glass 10.

The inner surface 24 of each flange 22 is formed with an annular recess 25 at the juncture between surface 24 and passageway 23 and concentric with passageway 23. The axial inner surface of the recess 25 includes a groove 20 for reception of the "O"-ring 16. The recesses 25 and grooves 20 are precision ground to ensure that excessive pressure cannot be applied to the sight glass 12 during assembly and so that when the machined precision shoulder studs 26 are placed in position, a leak-proof joint will be formed between the sight glass 12 and the flanges 22. Thus, each end 14 of the sight glass 12 is disposed concentric with the center axis of each flange 22, respectively, and the sight glass length is such that the two ends will lie within the recesses 25 for engagement with the "O"-rings 16 in the grooves 20 to compress the "O"-rings 16 when the flanges 22, sight glass 12 and studs 26 are assembled.

The outer surface of each of the flanges 22 includes a cylindrical tubular rim 30 forming a continuation of passageway 23. These rims 30 are placed in axial alignment with the piping 32 for the purpose of permitting the passage of liquid, gas or other material through the piping 32 to be observed through the sight glass 12.

To secure the piping 32 to the tubular rims 30 both rims 30 have an annular groove 34 around the perimeter thereof for receiving a victualic clamp 35, such as a Victaulic Style 750 Reducing Coupling, for securing the piping 32 to each of the flange 22.

Each rim 30 includes an outwardly slanting conical portion 36 inwardly of the groove 34.

Immediately inwardly of the conical portion 36, each flange 22 forms an annular rim 40. Each of these annular rims 40 have four apertures 42 which are equally spaced circumferentially and equal distance from the center axis of the passageway 23. These apertures 42 extend through the respective annular rim 40 and receive the respective precision shoulder studs 26.

The spacing of the apertures 42 maximize the angles for observation of the fluid or the like through the sight glass 12 which enables one to see the flow of fluids through the pipe 32.

Through each aperture 42 is placed the respective machined precision shoulder stud 26. Each end of the stud 26 is provided with a shoulder 43 which engages the inner surface 24 of flange 22 with the end of the stud 26 outwardly of the shoulder 43 being threaded as indicated generally by numeral 44. A hex nut 46 is tightened on each end 44 to secure the sight glass 12 in place between the flanges 22. The studs 26 are made so that only the threaded end 44 will extend through the respective aperture 42. The length between the shoulders 43 on the stud 26 prohibits not only piping stress from being transferred to the sight glass 12 but, also, presets the compressive loads between the "O"-rings 16 and the sight glass 12.

The precision machined shoulder studs 26 ensure that excessive pressure to the glass 12 during assembly cannot be applied. Each of the shoulders 43 on the studs 26 bear all the piping stress load after installation is completed, and limit the movement of the flanges 22 toward each other so that no axial pressure is exerted on the sight glass 12, other than that which is necessary to maintain an effective "O"-ring seal.

The sight glass 12 of the present invention has a clear acrylic shield 50 covering the viewing area of the unit 10. The acrylic shield 50 is secured with 174 inch bolts 52. This is only a shield to protect the glass from a direct blow.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalency may be resulted, to fall within the scope of the invention which is intended to be limited only by the scope of the appended claims.

What is claimed is as follows:

1. A sight glass apparatus comprising a pair of spaced parallel annular flanges, each of said flanges including a passageway therethrough with the passageways being aligned, a transparent tubular member extending between said flanges with the ends of the tubular member being sealingly engaged with the flanges around the periphery of said passageways, means connecting the flanges to pipes to form a flow path through the tubular member to enable observation of the flow conditions, and a plurality of circumferentially spaced studs interconnecting the flanges outwardly of the tubular member, each of said studs including a shoulder adjacent each end thereof, said shoulders being in abutting engagement with the facing surfaces of the flanges to maintain the flanges in predetermined spaced relation, an annular resilient seal between each end of the tubular member and adjacent flange to exert resilient compression forces to the tubular member when the flanges are clamped against the shoulders to isolate the tubular member from forces exerted on the flanges by the pipes and flow path conditions, the internal periphery of the tubular member and passageways being substantially equal to reduce restriction and turbulence in the flow path, each flange including a recess at the juncture between the inner surface of the flange and the passageway and a groove in the axial inner surface of the recess, the ends of the tubular member being telescoped into the recesses to maintain alignment of the tubular member with the flow path, said seal being an O-ring seal positioned between the axial inner surface of the groove and the end of the tubular member, each stud including a reduced threaded and extending axially from each shoulder, each flange including a plurality of apertures receiving the threaded ends of the studs, a retaining nut threaded on each end of each stud to rigidly secure the flanges in accurately spaced relation by clamping the flanges against the shoulders on the studs, a portion of the peripheral surface of the O-ring seal projecting from the groove and in contacting engagement with the end of the tubular member when uncompressed with assembly of the flanges, tubular member and studs transmitting compressive forces through the O-ring seal thereby limiting and controlling the forces exerted on the tubular member and isolating the tubular member from forces exerted on the flanges by the pipes and flow conditions, said tubular member being constructed of borosilicate glass, said means connecting the flanges to pipes including a tubular rim on the outer surface of each flange having an inner periphery substantially equal to the inner periphery of the passageways and the inner periphery of the tubular member, a transparent acrylic shield encircling the flanges and tubular member and means extending through the shield and resting against one of the flanges to support the shield.

* * * * *